United States Patent Office 3,247,966
Patented Apr. 26, 1966

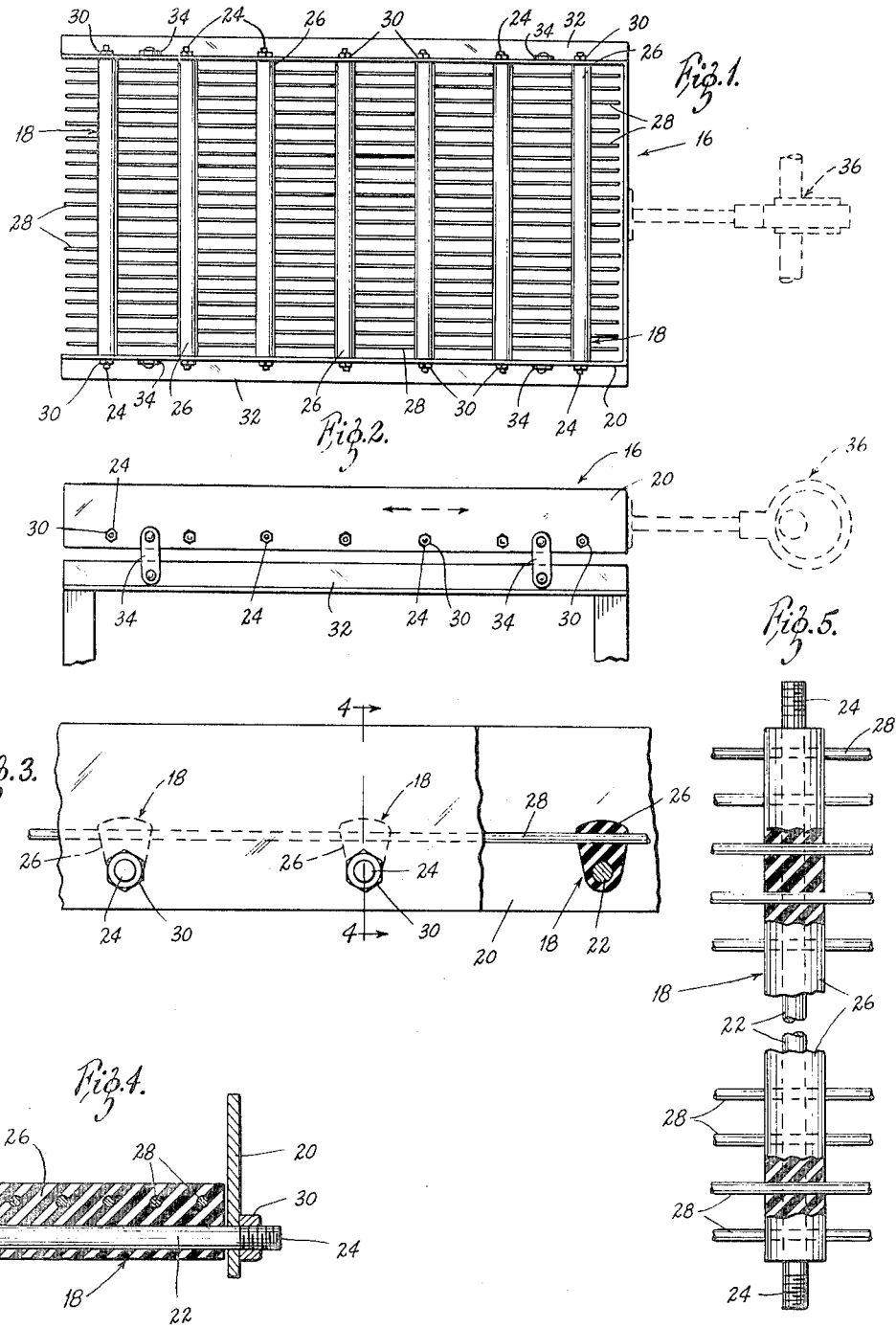

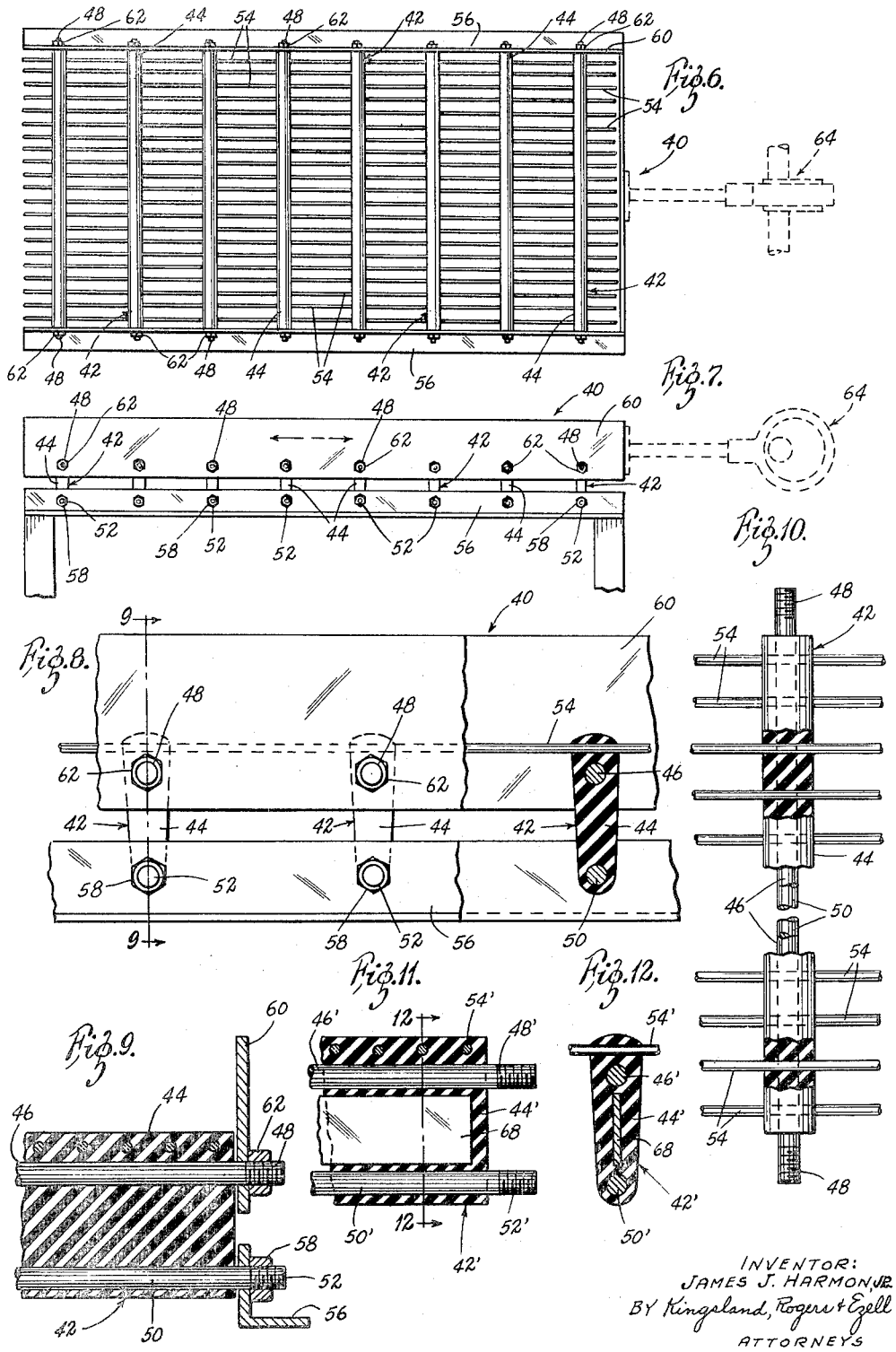

3,247,966
SCREEN
James J. Harmon, Jr., Clayton, Mo., assignor to Ludlow-Saylor Wire Cloth Company, St. Louis, Mo., a corporation of Missouri
Filed Jan. 17, 1964, Ser. No. 338,528
11 Claims. (Cl. 209—395)

The present application is a continuation-in-part of my pending application Serial No. 84,217, now abandoned, filed January 23, 1961.

The present invention relates generally to screens for separating materials, and more particularly to such screen construction incorporating resilient supporting elements.

There has long existed the need for a screen of accurate spacing, yet which will yield a predeterminate amount in use to prevent clogging, and which is not limited in respect to the physical properties, chemical composition, or cross section of the rods or wires from which the screen is made. For example, completely heat-treated high abrasion resisting rods or wires cannot be satisfactorily crimped or welded. Additionally, industry has long required a screen which can be effectively vibrated without the necessity of shaking the whole screen and support. Efforts have been directed towards these ends for many years in the screen manufacturing art, but without success insofar as the applicant is aware.

Therefore, an object of the present invention is to provide a novel screen for sizing, dewatering, grading, filtering, or the like, which satisfies the long-felt wants set forth in the preceding paragraph.

In brief, the present novel screen comprises transverse supports including rods, or the like, sheathed in vulcanized rubber, or other suitable material, which receive in spaced secured alignment longitudinal parallel bars, rods or wires of selected material. The cross-sections and the composition of the supports and bars may be varied as required or desired, but we are concerned in the ultimate with bars or wires which are of high abrasion and corrosion resistance to give long service. In one adaptation of the invention, the supports are vulcanized rubber and of an elongated cross-section, permitting vibration or oscillation of the supported rods, the lower portions of the supports being secured as mounts for the screen.

Therefore, another object of the present invention is to provide a novel screen which incorporates transverse supports receiving therethrough longitudinal rods and maintaining them in spaced relation.

Another object is to provide a novel screen incorporating longitudinal wires or rods of high abrasive resistance of long life.

Another object is to provide a novel screen incorporating longitudinal wires or rods of high abrasive resistance of long life which are anchored to a resilient support.

Another object is to provide a novel screen incorporating longitudinal wires or rods of high corrosive resistance of long life.

Another object is to provide a novel screen in which the longitudinal wires or rods are supported by resilient transverse members which permit a predetermined amount of lateral give in the use of the screen.

Another object is to provide a novel screen incorporating resilient transverse supports which receive therethrough in spaced relation longitudinal rods or wires of any predetermined cross-section or composition.

Another object is to provide a novel screen which incorporates resilient transverse supports for longitudinal rods in which the supports are of vertical elongated cross section, thereby permitting the upper portion to be reciprocated or vibrated without bodily movement of the lower portion.

Another object is to provide a novel screen incorporating resilient transverse supports and longitudinal rods extending therethrough which is of durable efficient construction.

The foregoing and other objects and advantages are apparent from the following description taken with the accompanying drawings, in which:

FIGURE 1 is a plan view of a screen, which takes for illustration the form of a grading or sizing screen, incorporating the principles of the present invention, a reciprocating member being shown in broken lines;

FIGURE 2 is a side elevational view of the screen of FIGURE 1, the supporting legs being broken away for conservation of space;

FIGURE 3 is an enlarged fragmentary view of a portion of FIGURE 2, portions being in vertical cross section for clarity of illustration;

FIGURE 4 is a vertical, transverse, fragmentary cross-sectional view taken on substantially the line 4—4 of FIGURE 3;

FIGURE 5 is an enlarged plan view of one of the resilient supporting members, the central portion being broken away for conservation of space and other portions being in cross section for clarity of illustration;

FIGURE 6 is a plan view of a modified screen construction incorporating the principles of the present invention in which the resilient supporting members are of a cross section for and are mounted to permit vibration or reciprocation of the upper portions thereof;

FIGURE 7 is a side elevational view of the screen of FIGURE 6, the lower portions of the legs being broken away for conservation of space;

FIGURE 8 is an enlarged fragmentary side elevational view of a portion of FIGURE 7, a portion being in cross section for clarity of illustration;

FIGURE 9 is a vertical transverse fragmentary cross-sectional view taken on substantially the line 9—9 of FIGURE 8;

FIGURE 10 is an enlarged plan view of one of the resilient supporting members of the screen of FIGURE 6, the central portion being broken away for conservation of space and other portions being in cross section for clarity of illustration;

FIGURE 11 is a view similar to FIGURE 9 of a modified resilient supporting member which includes a stiffening or reinforcing element; and FIGURE 12 is a vertical transverse cross-sectional view taken on substantially the line 12—12 of FIGURE 11.

Referring to the drawings more particularly by reference numerals, and particularly FIGURES 1–5, 16 indicates generally a screen illustrated as a grading screen, but which may take other forms and uses, constructed in accordance with the teachings of the present invention. The screen 16 includes a plurality of spaced resilient supporting members 18 supported by a three-sided frame 20. Each supporting member 18 includes a shaft 22 having threads 24 at each end and a body portion 26 of resilient material, such as vulcanized rubber, rubber-like material, plastic, or the like. The rubber material is vulcanized to rods or wires 28 by known processes, as by the use of molds. The supporting members 18 are maintained in position by nuts 30 threadedly engaging the threaded ends 24 of the rods 22.

The grading screen 16 is illustrated as mounted on a table frame 32 by means of four spaced links 34 for reciprocative vibration by an eccentric mechanism 36 illustrated in broken line in FIGURES 1 and 2. Obviously, the screen 16 may take any form desired or required.

The particular cross section of the resilient portion 26 can be varied as desired. For efficient use of the grading screen 16 where it is appropriately inclined and it is necessary to drop off at the open end material which does not pass through the rods 28, the cross section of the resilient portions 26 should not be of a form so that an undue amount of material is disposed above the upper plane of the rods 28, since dams would be created thereby. No problem is involved in respect to this with the cross section illustrated in the drawings. The resilient portion 26 may be of lesser height or depth than shown, since the rods 28 can be adjacent the shafts 22 and the resilient material can firmly anchor the rods 28 without fully covering them.

The resilient portion 26 will receive in secured relation rods or wires 28 of any desired cross section or any selected material. Preferably, completely heat-treated rods of high abrasive and corrosive resistant metal is employed, which as mentioned above, cannot be satisfactorily crimped or welded. A screen of long wear characteristics results. Rods of Teflon, plastic, or any material desired for a particular purpose may be used. Hence, the invention has wide application.

Referring to FIGURES 6–10, there is disclosed a modification of the present invention, which involves an additional feature. A grading screen 40 is illustrated in these figures, which includes supporting members 42, each having a resilient portion 44 of the cross section clearly shown in FIGURE 8. Extending axially through the upper part of each resilient portion 44 is a rod or shaft 46 having threads 48 at each end. Extending through the lower part of each resilient portion 44 is a rod or shaft 50 having threads 52 at each end. Each resilient portion 44 is vulcanized to parallel wires or rods 54, as above.

The lower rods 50 are mounted in a stationary table frame 56, being secured against movement by nuts 58. The rods 46 receive a three-sided frame 60 which retains material against dropping off the sides of the grading screen 40, nuts 62 maintaining the frame 60 in position. An eccentric 64 shown in FIGURES 6 and 7 in broken lines, is secured to the frame 60 for reciprocative vibration of the grading screen 40.

It is manifest that the resilient portion 44 of the supporting member 42 may be of any desired cross section and of any other suitable material, which will permit the lower part to be mounted on a stationary support and the upper part to be reciprocated in respect thereto.

Referring to FIGURES 11 and 12, the resilient portion 44' is reinforced longitudinally by the interiorly disposed plate 68, which may be of any desired thickness, height, and length, depending upon the characteristics which it is desired to impart to the resilient portion 44'. Obviously, the heavier the plate 68, the less resilient effect which remains in the resilient portion 44'.

It is apparent that there has been provided a screen which fulfills the objects and advantages sought therefor.

It is to be understood that the foregoing description and the accompanying drawings have been given by way of illustration and example. It is also to be understood that changes in form of the elements, rearrangement of parts, and substitution of equivalent elements and materials, which will be obvious to those skilled in the art, are contemplated as within the scope of the present invention which is limited only by the claims which follow.

What is claimed is.

1. A screen for handling materials comprising supporting members, and longitudinally extending spaced members mounted thereon adapted to receive materials being processed, said supporting members being of resilient material, said longitudinally extending members extending through said supporting members, said supporting members being of elongated vertical cross section, each supporting member having a first rod extending axially through the upper part and a second rod extending axially through the lower part, said first rods being connected to a common bodily movable structure, said second rods being mounted in a stationary support, said upper parts of said supporting members being reciprocatable relative to said lower parts thereof.

2. In combination, a screen comprising spaced transversely disposed supporting members, each supporting member comprising a rod and a sheath of resilient material, said sheath being of a cross section to provide a mass of substantial depth at at least one side of the rod, and spaced longitudinally disposed members extending through said mass of resilient material of substantial depth in firm relation therewith.

3. In combination, a screen comprising spaced transversely disposed supporting members, each supporting member comprising a rod and a sheath of resilient material, said sheath being of a cross section to provide a mass of substantial depth at at least one side of the rod, and spaced longitudinally disposed members extending through said mass of resilient material of substantial depth in firm relation therewith, said supporting members being disposed across the flow of material on said screen, said sheath being of a top cross section permitting ready passage of material thereover.

4. A screen for handling materials comprising supporting members, longitudinally extending spaced members mounted thereon adapted to receive materials being processed, said supporting members being of resilient material, said longitudinally extending members extending through said supporting members, said supporting members being of elongated vertical cross section, each supporting member having a first rod extending axially through the upper part and a second rod extending axially through the lower part, said first rods being connected to a common bodily movable structure, said second rods being mounted in a stationary support, said upper parts of said supporting members being reciprocatable relative to said lower parts thereof, and reinforcing means extending through each supporting member disposed between said rods.

5. A screen for handling materials comprising supporting members, and longitudinally extending spaced members mounted thereon adapted to receive materials being processed, said supporting members being of resilient material, said longitudinally extending members extending through said supporting members, said supporting members being of elongated vertical cross section, each supporting member having a first rod extending axially through the upper part and a second rod extending axially through the lower part, said first rods being connected to a common bodily movable structure, said second rods being mounted in a stationary support, said upper parts of said supporting members being reciprocatable relative to said lower parts thereof, said supporting members being disposed transversely to the flow of material along said screen and being of a cross section at the top permitting ready passage of material thereover.

6. In combination, a screen comprising spaced transversely disposed supporting members, each supporting member comprising a rod and a sheath of resilient materal, and spaced longitudinally disposed members extending through said resilient material in secured relation therewith, said sheath being of a cross section to provide on at least one side of said rod a mass of material of a depth sufficient to retain said members in said secured relation therewith.

7. In combination, a screen comprising spaced transversely disposed supporting members, each supporting member comprising a rod and a sheath of resilient material, and spaced longitudinally disposed members extending through said resilient material in secured relation therewith, said sheath being of a cross section to provide on at least one side of said rod a mass of material of a depth sufficient to retain said members in said secured relation therewith, said supporting members being disposed across the flow of material on said screen, said sheath being of a top cross section permitting ready passage of material thereover.

8. In combination, a screen comprising spaced transversely disposed supporting members, each supporting member comprising a rod and a sheath of resilient material, and spaced longitudinally disposed members of very high abrasive resistant material providing a life many times that of stainless steel extending through said resilient material in secured relation therewith, said sheath being of a cross section to provide on at least one side of said rod a mass of material of a depth sufficient to retain said members in said secured relation therewith.

9. In combination, a screen comprising spaced transversely disposed supporting members, each supporting member comprising a rod and a sheath of resilient material, and spaced longitudinally disposed members of very high abrasive resistant material providing a life many times that of stainless steel extending through said resilient material in secured relation therewith, said sheath being of a cross section to provide on at least one side of said rod a mass of material of a depth sufficient to retain said members in said secured relation therewith, said supporting members being disposed across the flow of material on said screen, said sheath being of a top cross section permitting ready passage of material thereover.

10. In combination, a screen comprising spaced transversely disposed supporting members, each supporting member comprising a rod and a sheath of resilient material, and spaced longitudinally disposed members extending through said resilient material and bonded thereto, said sheath being of a cross section to provide on at least one side of said rod a mass of material of a depth sufficient to retain said members in said bonded relation therewith.

11. In combination, a screen comprising spaced transversely disposed supporting members, each supporting member comprising a rod and a sheath of resilient material, and spaced longitudinally disposed members extending through said resilient material and bonded thereto, said sheath being of a cross section to provide on at least one side of said rod a mass of material of a depth sufficient to retain said members in said bonded relation therewith, said supporting members being disposed across the flow of material on said screen, said sheath being of a top cross section permitting ready passage of material thereover.

References Cited by the Examiner

UNITED STATES PATENTS

| | | | |
|---|---|---|---|
| 956,617 | 5/1919 | Adams | 209—395 |
| 2,010,256 | 8/1935 | Cole | 209—395 |
| 2,314,880 | 3/1940 | Heller | 209—395 |
| 2,374,775 | 5/1945 | Parks | 209—400 |
| 2,468,558 | 3/1949 | Johnson | 267—83 |
| 2,706,112 | 4/1955 | Carrier | 267—1 |
| 2,787,277 | 4/1957 | Barry | 209—329 |
| 2,802,571 | 8/1957 | Symons | 209—394 |
| 2,837,210 | 6/1958 | Ackert | 209—400 |
| 2,846,210 | 8/1958 | Carrier | 267—1 |
| 2,910,180 | 10/1959 | Parks | 209—395 |
| 2,914,177 | 11/1959 | Parks | 209—394 |
| 2,916,145 | 12/1959 | Kaiser | 210—499 |
| 3,042,206 | 7/1962 | Olender | 209—395 |

FOREIGN PATENTS

| | | |
|---|---|---|
| 650,690 | 9/1935 | Germany. |
| 1,036,782 | 8/1958 | Germany. |
| 419,132 | 3/1947 | Italy. |

HARRY B. THORNTON, *Primary Examiner.*

REUBEN FRIEDMAN, *Examiner.*